United States Patent
Ping et al.

(10) Patent No.: US 8,966,192 B2
(45) Date of Patent: *Feb. 24, 2015

(54) MEMORY CONTROL SYSTEM AND METHOD

(71) Applicant: Novatek Microelectronics Corp., Hsinchu (TW)

(72) Inventors: Te-Lin Ping, Hsinchu (TW); I-Huan Huang, Tainan (TW)

(73) Assignee: Novatek Microelectronics Corp., HsinChu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,239

(22) Filed: Jun. 7, 2013

(65) Prior Publication Data

US 2013/0275689 A1 Oct. 17, 2013

Related U.S. Application Data

(63) Continuation of application No. 13/042,013, filed on Mar. 7, 2011, now Pat. No. 8,499,126.

(30) Foreign Application Priority Data

Mar. 8, 2010 (TW) ................................. 99106661 A

(51) Int. Cl.
*G06F 12/00* (2006.01)
(52) U.S. Cl.
CPC ...................................... *G06F 12/00* (2013.01)
USPC .......................................................... 711/154

(58) Field of Classification Search
None
See application file for complete search history.

(56) References Cited

U.S. PATENT DOCUMENTS

| | | | |
|---|---|---|---|
| 6,182,196 B1 | 1/2001 | DeRoo | |
| 7,734,860 B2 | 6/2010 | Sakata | |
| 2003/0146916 A1* | 8/2003 | Yeh et al. | 345/535 |
| 2004/0233208 A1* | 11/2004 | Hussain | 345/557 |
| 2005/0163228 A1* | 7/2005 | Hatti et al. | 375/240.28 |
| 2010/0027663 A1* | 2/2010 | Dai et al. | 375/240.16 |

FOREIGN PATENT DOCUMENTS

CN 1160641 C 8/2004

\* cited by examiner

*Primary Examiner* — Duc Doan
(74) *Attorney, Agent, or Firm* — Rabin & Berdo, P.C.

(57) ABSTRACT

A memory control system includes a first queue unit, a second queue unit, a first transforming unit, a second transforming unit, an arbiter and a control unit. The first queue unit temporarily stores multiple first request instructions. The second queue unit temporarily stores multiple second request instructions. The first transforming unit selectively re-assigns memory addresses corresponding to these first request instructions. The second transforming unit selectively re-assigns memory addresses corresponding to these second request instructions. The arbiter performs immediate scheduling of the one or more first request instructions and the one or more second request instructions to the memory. The control unit compares bandwidths of the one or more first request instructions with bandwidths of the one or more second request instructions, and controls the first transforming unit and the second transforming unit to perform re-assigning operations or not according to compared results.

27 Claims, 2 Drawing Sheets

MEMORY CONTROL SYSTEM AND METHOD

This application is a continuation application of co-pending application Ser. No. 13/042,013, filed on Mar. 7, 2011, which claims the benefit of Taiwan application Serial No. 99106661, filed Mar. 8, 2010. The contents of which are incorporated herein by reference.

BACKGROUND OF THE INVENTION

1. Field of the Invention

The invention relates in general to a memory control system and a memory control method, and more particularly to a memory control system and a memory control method capable of optimizing the memory usage performance.

2. Description of the Related Art

When data are written to or read from a memory, many steps including activating, instruction writing/reading and pre-charging have to be sequentially performed so that the data can be accessed. The request instructions for different sources have different methods for accessing the memory. In a display controller of a television system, for example, the display controller is for displaying video frames, and the display request instructions thereof shown in FIG. 1 correspond to the line-by-line data access to the memory. The data accessed according to the display request instructions for the line-by-line access in the memory are continuous, so the data access may be a pipeline access to achieve the best memory bandwidth availability.

In addition, taking the video decoder as an example, its decoding request instructions are shown in FIG. 2 and correspond to the block data access to the memory. However, the decoding request instructions corresponding to the block access may have the phenomenon that the page address is not hit but the bank address is hit when the memory addresses are switched. Thus, the pipeline method cannot be adopted to hide the activating instructions, thereby decreasing the performance, and the best memory bandwidth availability cannot be achieved. Thus, a tiling mechanism is disclosed. In the tiling mechanism, the memory addresses are mapped again so that the addresses of the data of the memory accessed by the video decoder are continuous although the memory is accessed with the block serving as one unit. Thus, the condition that the page address is not hit can be significantly reduced, and the memory bandwidth availability can be enhanced.

However, the television system available in the market usually contains a display controller and a video decoder. That is, two memory access methods including the line-by-line access and the block access do exist in the single system. Consequently, if the line-by-line access is adopted, then the memory accessing performance of the video decoder becomes poor. If the tiling mechanism is adopted to map the memory addresses again, then the memory accessing performance of the display controller becomes poor. That is, in the conventional memory access technology, the system including two memory access methods cannot achieve the best memory bandwidth availability.

SUMMARY OF THE INVENTION

The invention is directed to a memory control system and a memory control method, which utilize a classification queue to collect the same type of request instructions, and correspond to the independent transforming mechanism according to the requirement so that the object of optimizing the overall system performance can be achieved.

According to a first aspect of the present invention, a memory control system including a first queue unit, a second queue unit, a first transforming unit, a second transforming unit, an arbiter and a control unit is provided. The first queue unit temporarily stores one or more first request instructions corresponding to a line-by-line access to a memory. The second queue unit temporarily stores one or more second request instructions corresponding to a block access to the memory. The first transforming unit selectively re-assigns memory addresses corresponding to the one or more first request instructions. The second transforming unit selectively re-assigns memory addresses corresponding to the one or more second request instructions. The arbiter, coupled to the first transforming unit and the second transforming unit, performs immediate scheduling of the one or more first request instructions and the one or more second request instructions to the memory. The control unit compares the one or more first request instructions with the one or more second request instructions, and controls the first transforming unit and the second transforming unit to perform re-assigning operations or not according to compared results.

According to a second aspect of the present invention, a memory control method is provided. The method includes the following steps: temporarily storing one or more first request instructions corresponding to a line-by-line access to a memory; temporarily storing one or more second request instructions corresponding to a block access to the memory; performing immediate scheduling of the one or more first request instructions and the one or more second request instructions to the memory; comparing the one or more first request instructions with the one or more second request instructions; selectively re-assigning memory addresses corresponding to the one or more first request instructions, and selectively re-assigning memory addresses corresponding to the one or more second request instructions according to compared results.

According to a third aspect of the present invention, an electronic system including one or more first requesters, one or more second requestors, a first queue unit, a second queue unit, a first transforming unit, a second transforming unit, an arbiter and a control unit is provided. The one or more first requesters provides one or more first request instructions corresponding to a line-by-line access to a memory. The one or more second requestors provides one or more second request instructions corresponding to a block access to the memory. The first queue unit temporarily stores the one or more first request instructions. The second queue unit temporarily stores the one or more second request instructions. The first transforming unit selectively re-assigns memory addresses corresponding to the one or more first request instructions. The second transforming unit selectively re-assigns memory addresses corresponding to the one or more second request instructions. The arbiter, coupled to the first transforming unit and the second transforming unit, performs immediate scheduling of the one or more first request instructions and the one or more second request instructions to the memory. The control unit compares the one or more first request instructions with the one or more second request instructions, and controls the first transforming unit and the second transforming unit to perform re-assigning operations or not according to results of the comparison.

According to a fourth aspect of the present invention, a memory control system including a first queue unit, a second queue unit, a control unit, a first transforming unit, a second transforming unit and an arbiter is provided. The first queue unit temporarily stores one or more first request instructions for accessing a memory from one or more first requestors. The second queue unit temporarily stores one or more second request instructions for accessing the memory from one or more second requestors. The first transforming unit, controlled by the control unit, selectively re-assigns memory addresses corresponding to the one or more first request instructions. The second transforming unit, controlled by the control unit, selectively re-assigns memory addresses corresponding to the one or more second request instructions. The arbiter, coupled to the first transforming unit and the second transforming unit, performs immediate scheduling of the one or more first request instructions and the one or more second request instructions to the memory.

According to a fifth aspect of the present invention, a memory control method is provided. The method includes the following steps: temporarily storing one or more first request instructions for accessing a memory from one or more first requestors; temporarily storing one or more second request instructions for accessing the memory from one or more second requestors; selectively re-assigning memory addresses corresponding to the one or more first request instructions; selectively re-assigning memory addresses corresponding to the one or more second request instructions; and performing immediate scheduling of the one or more first request instructions and the one or more second request instructions to the memory.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a memory control system and a memory control method utilizing a classification queue to classify different types of request instructions, so that they have individual independent address transforming mechanisms, and the address transforming mechanisms may be dynamically selected according to the requirement to achieve the object of optimizing the overall system performance.

Figure 1:
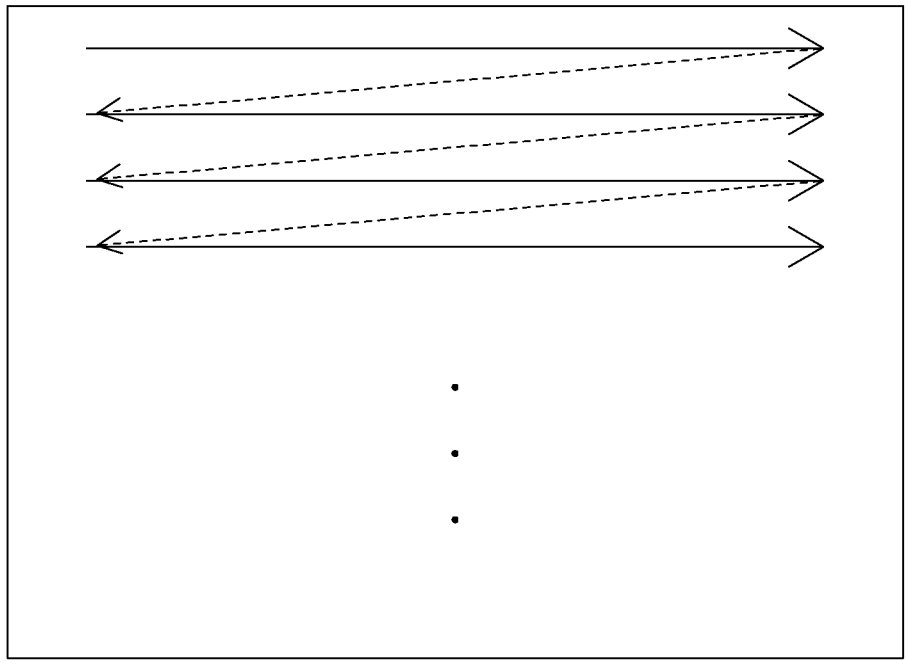
FIG. 1 (Prior Art) is a schematic illustration showing a conventional display controller, which performs a line-by-line access to a memory.
Figure 2:
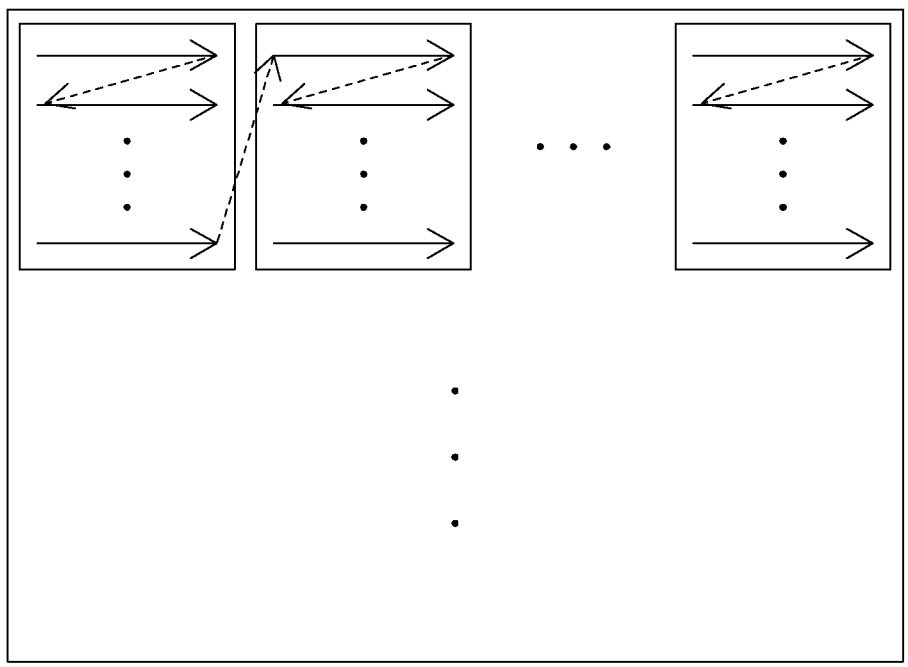
FIG. 2 (Prior Art) is a schematic illustration showing a conventional video decoder, which performs a block access to the memory.
Figure 3:
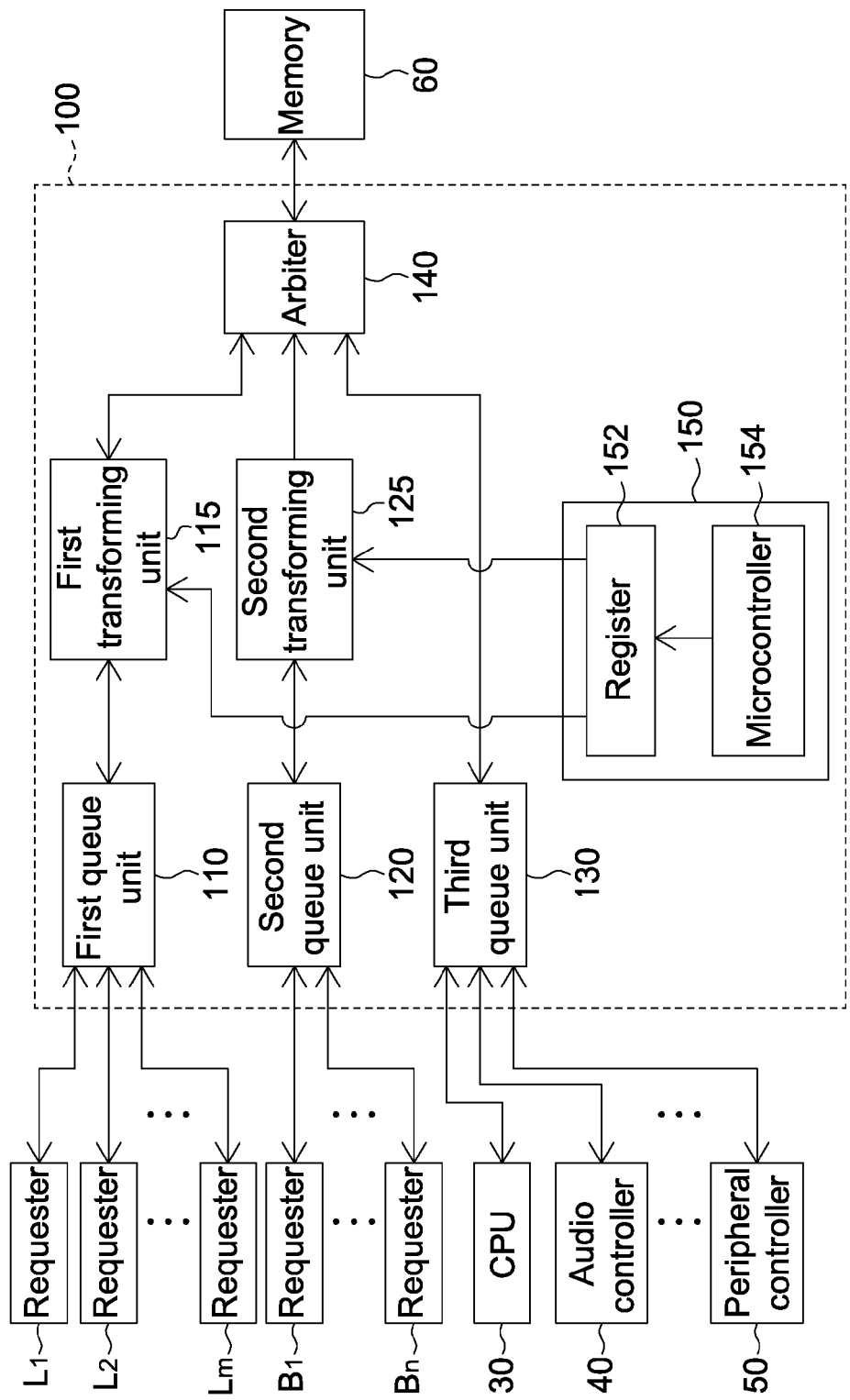
FIG. 3 is a block diagram showing a memory control system according to a preferred embodiment of the invention.

FIG. 3 is a block diagram showing a memory control system 100 according to a preferred embodiment of the invention. Referring to FIG. 3, the memory control system 100 includes a first queue unit 110, a second queue unit 120, a third queue unit 130, a first transforming unit 115, a second transforming unit 125, an arbiter 140 and a control unit 150. The first queue unit 110 temporarily stores multiple first request instructions, which correspond to a line-by-line access to a memory 60. The second queue unit 120 temporarily stores multiple second request instructions, which correspond to a block access to the memory 60. The first request instruction is, for example, a display request instruction for displaying a video frame. The second request instruction is, for example, a decoding request instruction for decoding data. However, the invention is not particularly limited thereto. The third queue unit 130 temporarily stores other types of request instructions, such as the request instructions coming from a central processing unit (CPU) 30, an audio controller 40 or a peripheral controller 50. That is, different types of request instructions are classified and temporarily stored to different queue units.

The first transforming unit 115 is coupled to the first queue unit 110 and controlled by the control unit 150 to selectively re-assign memory addresses corresponding to the first request instructions, so that the line-by-line access of the first request instructions to the memory 60 is transformed into the block access. The second transforming unit 125 is coupled to the second queue unit 120 and controlled by the control unit 150 to selectively re-assign memory addresses corresponding to the second request instructions, so that the block access of the second request instructions to the memory 60 is transformed into the line-by-line access. That is, after the second request instructions are re-assigned with the memory addresses, the addresses of the accessed data of the memory 60 are continuous.

The arbiter 140, coupled to the first transforming unit 115, the second transforming unit 125 and the third queue unit 130, performs immediate scheduling of the first request instructions of the first queue unit 110, the second request instructions of the second queue unit 120 and the other request instructions of the third queue unit 130 to the memory 60. The control unit 150 compares bandwidths of the first request instructions with bandwidths of the second request instructions, and controls the first transforming unit 115 and the second transforming unit 125 to perform re-assigning operations of the memory addresses or not according to compared results.

The control unit 150 includes a register 152 and a microcontroller 154. The register 152 is coupled to the first transforming unit 115 and the second transforming unit 125. The microcontroller 154 calculates the bandwidths of the first request instructions and the bandwidths of the second request instructions, and outputs a first control instruction to the register 152 to enable or disable the first transforming unit 115 and outputs a second control instruction to the register 152 to enable or disable the second transforming unit 125 according to calculated results. The microcontroller 154 substantially further calculates access bandwidths to the memory 60 after the first request instructions and the second request instructions are re-assigned with corresponding memory addresses.

Assume the memory control system 100 as corresponding to m line-by-line accessed requesters $L_1$ to $L_m$, and corresponding to n block accessed requesters $B_1$ to $B_n$, wherein m and n are positive integers. In addition, assume the re-assigning mechanism of the first/second request instructions for accessing, from the memory 60, the data for the display usage to be f(x), and the re-assigning mechanism of the second request instructions for accessing, from the memory 60, the data for the decoding usage to be g(x). If L(X) and B(X) respectively represent the bandwidths of the requesters of the line-by-line access and the block access, then the bandwidths of the requesters $L_1$ to $L_m$ of the line-by-line access are respectively $L(L_1)$ to $L(L_m)$, and the bandwidths of the requesters $B_1$ to $B_n$ of the block access are respectively $B(B_1)$ to $B(B_n)$.

When the microcontroller 154 judges that the bandwidths of the first request instructions exceed the bandwidths of the second request instructions by a first threshold value (i.e., the required bandwidths of the first request instructions of the line-by-line access are higher than the required bandwidths of the second request instructions of the block access), the microcontroller 154 outputs the first control instruction and the second control instruction to the register 152 to disable the first transforming unit 115 and the second transforming unit 125, respectively. At this time, the overall bandwidth BW, which is equal to $L(L_1)+L(L_2)+ \ldots +L(L_m)+B(B_1)+B(B_2)+\ldots+B(B_n)$ and calculated by the microcontroller 154, has to fall within the bandwidth range that can be provided by the memory 60. The first request instructions are, for example, the display request instructions, and the second request instructions are, for example, the decoding request instructions. In this case, it represents that the required bandwidths for display (e.g., the display of the high definition video) are high, and the microcontroller 154 disables the first transforming unit 115 and the second transforming unit 125 to disable the re-assigning mechanisms f(x) and g(x) and thus to achieve the best memory bandwidth availability.

When the microcontroller 154 judges that the bandwidths of the second request instructions exceed the bandwidths of the first request instructions by a second threshold value (i.e., the required bandwidths of the second request instructions of the block access are higher than the required bandwidths of the first request instructions of the line-by-line access), the microcontroller 154 outputs the first control instruction and the second control instruction to the register 152 to enable the first transforming unit 115 and the second transforming unit 125, respectively. At this time, the dynamic adjustment bandwidth $BW_d$, which is equal to $L2B(L_1)+L2B(L_2)+ \ldots +L2B(L_m)+B2L(B_1)+B2L(B)+ \ldots +B2L(B)$ and calculated by the microcontroller 154, has to fall within the bandwidth range that can be provided by the memory 60. The first request instructions are, for example, the display request instructions, while the second request instructions are, for example, the decoding request instructions. In this case, it represents that the required bandwidths for display are low, and the microcontroller 154 enables the first transforming unit 115 and the second transforming unit 125 to enable the re-assigning mechanisms f(x) and g(x) and thus to achieve the best memory bandwidth availability.

When the microcontroller 154 judges that an upper bound bandwidth of the memory control system 100 is lower than a third threshold value (i.e., the bandwidth that can be provided by the memory 60 is limited), the microcontroller 154 outputs the first control instructions to disable the first transforming unit 115, and outputs the second control instructions to re-assign the memory addresses corresponding to other second request instructions, which do not correspond to the data for the display usage. If the first request instructions are the display request instructions and the second request instructions are the decoding request instructions, for example, and r represents the number of requesters, which do not correspond to the data for the display usage, then the dynamic adjustment bandwidth $BW_d$, which is equal to $L(L_1)+L(L_2)+ \ldots +L(L_m)+B2L(B_1)+B2L(B_2)+ \ldots +B2L(B_r)+B(B_{r+1})+ \ldots +B(B_n)$ and is calculated by the microcontroller 154, needs to fall within the bandwidth range that can be provided by the memory 60. At this time, the microcontroller 154 disables the re-assigning mechanism f(x), and enables the re-assigning mechanism g(x) to achieve the best memory bandwidth availability.

In addition, the microcontroller 154 may further calculate the access bandwidth to the memory 60 after a portion of the first request instructions and a portion of the second request instructions are re-assigned with the corresponding memory addresses. If p represents the number of requesters transformed from the line-by-line access to the block access, and q represents the number of requesters transformed from the block access to the line-by-line access, then the dynamic adjustment bandwidth $BW_d$ calculated by the microcontroller 154 is equal to $L2B(L_1)+L2B(L_2)+ \ldots +L2B(L_p)+L(L_{p+1})+L(L_{p+2})+ \ldots +L(L_m)+B2L(B_1)+B2L(B_2)+ \ldots +B2L(B_q)+B(B_{q+1})+B(B_{q+2})+ \ldots +B(B_n)$. That is, the dynamic adjustment bandwidths $BW_d$ corresponding to different settings can be obtained by adjusting the values of p and q. Thus, the suitable dynamic adjustment bandwidth $BW_d$ can be provided in different product applications according to required different bandwidths of the memories by adjusting the values of p and q. Thus, the best memory bandwidth availability can be achieved, the product can be optimized and the cost can be minimized advantageously.

In addition, the invention further provides a memory control method including the following steps. First, a first queue unit is utilized to temporarily store multiple first request instructions, which correspond to a line-by-line access to a memory. Next, a second queue unit is utilized to temporarily store multiple second request instructions, which correspond to a block access to the memory. Then, an arbiter is utilized to perform immediate scheduling of the first request instructions and the second request instructions to the memory. Next, a control unit is utilized to compare bandwidths of the first request instructions with bandwidths of the second request instructions, to control a first transforming unit to selectively re-assign memory addresses corresponding to the first request instructions, and to control a second transforming unit to selectively re-assign memory addresses corresponding to the second request instructions according to compared results.

The operation principles of the memory control method have been described in the memory control system 100, so detailed descriptions thereof will be omitted.

The memory control system and method according to the embodiment of the invention have many advantages, some of which will be listed in the following.

The memory control system and method of the invention utilize the classification queue to classify different types of request instructions, so that they have individual independent address transforming mechanisms, and the address transforming mechanisms may be dynamically selected according to the requirement to provide the suitable dynamic adjustment bandwidth. Thus, the overall system performance can be optimized, the product can be optimized, and the cost can be minimized advantageously.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory control system, comprising:
a first queue unit for temporarily storing one or more first request instructions corresponding to a line-by-line access to a memory;
a second queue unit for temporarily storing one or more second request instructions corresponding to a block access to the memory;
a first transforming unit for selectively re-assigning memory addresses corresponding to the one or more first request instructions;
a second transforming unit for selectively re-assigning memory addresses corresponding to the one or more second request instructions;

an arbiter, coupled to the first transforming unit and the second transforming unit, for performing immediate scheduling of the one or more first request instructions and the one or more second request instructions to the memory; and a control unit for comparing bandwidths of the one or more first request instructions with bandwidths of the one or more second request instructions, and controlling the first transforming unit and the second transforming unit to perform re-assigning operations or not according to compared results.

2. The memory control system according to claim 1, wherein the one or more first request instructions include one or more display request instructions.

3. The memory control system according to claim 1, wherein the one or more second request instructions include one or more decoding request instructions.

4. The memory control system according to claim 1, wherein the first transforming unit is controlled by the control unit to selectively re-assign the memory addresses corresponding to the one or more first request instructions, so that the line-by-line access of the one or more first request instructions to the memory is transformed into the block access.

5. The memory control system according to claim 1, wherein the second transforming unit is controlled by the control unit to selectively re-assign the memory addresses corresponding to the one or more second request instructions, so that the block access of the one or more second request instructions to the memory is transformed into the line-by-line access.

6. The memory control system according to claim 1, wherein the control unit comprises:
a register, coupled to the first transforming unit and the second transforming unit; and
a microcontroller for outputting a first control instruction to the register to enable or disable the first transforming unit and outputting a second control instruction to the register to enable or disable the second transforming unit according to results of the comparison.

7. A memory control method, comprising the steps of:
temporarily storing one or more first request instructions corresponding to a line-by-line access to a memory;
temporarily storing one or more second request instructions corresponding to a block access to the memory;
performing immediate scheduling of the one or more first request instructions and the one or more second request instructions to the memory;
comparing bandwidths of the one or more first request instructions with bandwidths of the one or more second request instructions;
selectively re-assigning memory addresses corresponding to the one or more first request instructions, and selectively re-assigning memory addresses corresponding to the one or more second request instructions according to compared results.

8. The method according to claim 7, wherein the one or more first request instructions include one or more display request instructions.

9. The method according to claim 7, wherein the one or more second request instructions include one or more of decoding request instructions.

10. An electronic system, comprising:
one or more first requesters for providing one or more first request instructions corresponding to a line-by-line access to a memory;
one or more second requesters for providing one or more second request instructions corresponding to a block access to the memory;
a first queue unit for temporarily storing the one or more first request instructions;
a second queue unit for temporarily storing the one or more second request instructions;
a first transforming unit for selectively re-assigning memory addresses corresponding to the one or more first request instructions;
a second transforming unit for selectively re-assigning memory addresses corresponding to the one or more second request instructions;
an arbiter, coupled to the first transforming unit and the second transforming unit, for performing immediate scheduling of the one or more first request instructions and the one or more second request instructions to the memory; and
a control unit for comparing bandwidths of the one or more first request instructions with bandwidths of the one or more second request instructions, and controlling the first transforming unit and the second transforming unit to perform re-assigning operations or not according to results of the comparison.

11. A memory control system, comprising:
a first queue unit for temporarily storing one or more first request instructions for accessing a memory from one or more first requesters;
a second queue unit for temporarily storing one or more second request instructions for accessing the memory from one or more second requesters;
a control unit for comparing bandwidths of the one or more first request instructions with bandwidths of the one or more second request instructions;
a first transforming unit, controlled by the control unit to selectively re-assign memory addresses corresponding to the one or more first request instructions, based on results the bandwidths comparing;
a second transforming unit, controlled by the control unit to selectively re-assign memory addresses corresponding to the one or more second request instructions, based on results the bandwidths comparing; and
an arbiter, coupled to the first transforming unit and the second transforming unit, for performing immediate scheduling of the one or more first request instructions and the one or more second request instructions to the memory.

12. The memory control system according to claim 11, wherein the one or more first request instructions include one or more display request instructions, and the one or more second request instructions include one or more decoding request instructions.

13. The memory control system according to claim 11, wherein each of the one or more first request instructions corresponds to a first access type to a memory, and each of the one or more second request instructions corresponds to a second access type to the memory.

14. The memory control system according to claim 13, wherein one of the first and second access types to the memory is a line-by-line access to the memory, and the other one of the first and second access types to the memory is a block access to the memory.

15. The memory control system according to claim 11, wherein at least one of the first and second transforming units is enabled or disabled by the control unit to re-assign the memory addresses corresponding to the one or more first request instructions or not.

16. The memory control system according to claim 11, wherein a re-assigning mechanism of the one or more first request instructions is a first re-assigning mechanism enabled or disabled by the control unit.

17. The memory control system according to claim 16, wherein a re-assigning mechanism of the one or more second request instructions is the first re-assigning mechanism or a second re-assigning mechanism, each of the first and second re-assigning mechanisms being enabled or disabled by the control unit.

18. The memory control system according to claim 11, wherein a respective re-assigning mechanism of each of at least one or the one or more first request instructions and the one or more second request instructions is controlled by the control unit to be one of a plurality of re-assigning mechanisms, each of the re-assigning mechanisms being enabled or disabled by the control unit.

19. The memory control system according to claim 11, wherein a respective re-assigning mechanism of each of the one or more first request instructions and the one or more second request instructions is one of one or more re-assigning mechanisms, each of the one or more re-assigning mechanisms being enabled or disabled by the control unit.

20. The memory control system according to claim 11, wherein at least one of the first and second transforming units is controlled by the control unit to selectively re-assign the memory addresses corresponding to the one or more first or second request instructions, so that an access type of the one or more first or second request instructions to the memory is transformed to a different access type.

21. The memory control system according to claim 20, wherein the control unit obtains dynamic adjustment bandwidths corresponding to different settings by adjusting respective numbers of the requesters transformed between different access types.

22. The memory control system according to claim 11, wherein a respective re-assigning mechanism of each of the one or more first request instructions and the one or more second request instructions is controlled by the control unit, such that a dynamic adjustment bandwidth associated with the one or more first request instructions and the one or more second request instructions falls within a bandwidth range provided by the memory.

23. A memory control method, comprising the steps of:
temporarily storing one or more first request instructions for accessing a memory from one or more first requesters;
temporarily storing one or more second request instructions for accessing the memory from one or more second requesters;
comparing bandwidths of the one or more first request instructions with bandwidths of the one or more second request instructions;
selectively re-assigning memory addresses corresponding to the one or more first request instructions, based on results of said comparing;
selectively re-assigning memory addresses corresponding to the one or more second request instructions, based on results of said comparing; and
performing immediate scheduling of the one or more first request instructions and the one or more second request instructions to the memory.

24. The memory control method according to claim 23, wherein the one or more first request instructions include one or more display request instructions, and the one or more second request instructions include one or more decoding request instructions.

25. The memory control method according to claim 23, wherein each of the one or more first request instructions corresponds to a first access type to a memory, and each of the one or more second request instructions corresponds to a second access type to the memory.

26. The memory control method according to claim 25, wherein one of the first and second access types to the memory is a line-by-line access to the memory, and the other one of the first and second access types to the memory is a block access to the memory.

27. The memory control method according to claim 23, wherein the selectively re-assigning memory addresses corresponding to the one or more first request instructions and the selectively re-assigning memory addresses corresponding to the one or more second request instructions are performed such that a dynamic adjustment bandwidth associated with the one or more first request instructions and the one or more second request instructions falls within a bandwidth range provided by the memory.

* * * * *